US008356792B2

(12) United States Patent
Grimseth et al.

(10) Patent No.: US 8,356,792 B2
(45) Date of Patent: Jan. 22, 2013

(54) SUB SEA ACTUATOR

(75) Inventors: Tom Grimseth, Oslo (NO); Tom Kjonigsen, Sande (NO)

(73) Assignee: Vetco Gray Scandinavia AS, Sandvika (NO)

( * ) Notice: Subject to any disclaimer, the term of this patent is extended or adjusted under 35 U.S.C. 154(b) by 293 days.

(21) Appl. No.: 12/667,539

(22) PCT Filed: Jun. 23, 2008

(86) PCT No.: PCT/IB2008/001636
§ 371 (c)(1),
(2), (4) Date: Jun. 15, 2010

(87) PCT Pub. No.: WO2009/004431
PCT Pub. Date: Jan. 8, 2009

(65) Prior Publication Data
US 2010/0243077 A1 Sep. 30, 2010

Related U.S. Application Data

(60) Provisional application No. 60/929,565, filed on Jul. 3, 2007.

(51) Int. Cl.
*F16K 31/02* (2006.01)
(52) U.S. Cl. .................. 251/129.06; 251/11; 251/95
(58) Field of Classification Search .............. 251/11, 251/129.06, 95; 137/486
See application file for complete search history.

(56) References Cited

U.S. PATENT DOCUMENTS

| 4,492,359 | A | * | 1/1985 | Baugh | 251/1.3 |
|---|---|---|---|---|---|
| 4,522,219 | A | * | 6/1985 | Ohkata | 137/62 |
| 4,523,605 | A | * | 6/1985 | Ohkata | 137/62 |
| 4,601,311 | A | * | 7/1986 | Acker | 137/625.66 |
| 4,619,320 | A | | 10/1986 | Adnyana et al. | |
| 4,836,496 | A | * | 6/1989 | Abujudom et al. | 251/11 |
| 4,840,346 | A | | 6/1989 | Adnyana et al. | |
| 4,955,196 | A | * | 9/1990 | Lin et al. | 60/527 |
| 5,070,697 | A | * | 12/1991 | Van Zeggeren | 60/527 |
| 6,276,396 | B1 | * | 8/2001 | Kirkman | 137/625.64 |
| 6,367,250 | B1 | * | 4/2002 | Baumbick | 60/527 |
| 6,447,478 | B1 | * | 9/2002 | Maynard | 604/95.05 |
| 2004/0173362 | A1 | | 9/2004 | Waithman et al. | |

FOREIGN PATENT DOCUMENTS

| DE | 10130065 | 1/2003 |
|---|---|---|
| EP | 0959282 | 11/1999 |
| JP | 10-141540 | 5/1998 |
| JP | 2003-294167 | 10/2003 |

(Continued)

OTHER PUBLICATIONS

PCT/ISA/210—International Search Report—Oct. 28, 2008.

(Continued)

*Primary Examiner* — John K Fristoe, Jr.
*Assistant Examiner* — R. K. Arundale
(74) *Attorney, Agent, or Firm* — Venable LLP; Eric J. Franklin

(57) ABSTRACT

A sub sea actuator including an actuator housing. An activating element is movably arranged between activating and deactivating positions, respectively. A return spring is supported in the actuator housing to move the activating element into the deactivating position. The sub sea actuator includes an SMA element supported in the actuator housing and arranged with a temperature elevator configured to control a temperature of the SMA element. The SMA element acts on the activating element to move the activating element into the activating position against the force of the return spring in result of a rise in the temperature of the SMA element.

14 Claims, 12 Drawing Sheets

FOREIGN PATENT DOCUMENTS

WO      WO 99/60267      11/1999

OTHER PUBLICATIONS

PCT/IPEA/409—International Preliminary Report on Patentability—Jan. 10, 2009.

Ma et al., Design and Performance Evaluation of an Ultradeepwater Subsea Blowout Preventer Control System Using Shape Memory Alloy Actuators, ATCE 2006, Focus on the future, SPE Annual Technical Conference and Exhibition, San Antonio, Texas, Sep. 24-27, 2006.

* cited by examiner

SUB SEA ACTUATOR

CROSS-REFERENCE TO RELATED APPLICATIONS

This application claims priority to U.S. provisional patent application 60/929,565 filed 3 Jul. 2007 and is the national phase under 35 U.S.C. §371 of PCT/IB2008/001636 filed 23 Jun. 2008.

TECHNICAL FIELD OF THE INVENTION

The present invention relates to an actuator of high force and requiring low power input, which is suitable for a sub sea environment and which provides high reliability of operation at low construction cost. In particular, the present invention relates to the various use of a sub sea actuator incorporating a shape memory alloy element for controlling a sub sea production system.

BACKGROUND AND PRIOR ART

The sub sea oil and gas industry has very critical safety functions depending on the capability to shut certain process valves, thus functioning as Emergency Shut Down (ESD) valves, on either loss of pressure integrity of the installation or on partial or complete loss of control and/or communication functionality in a sub sea production system. This capability is quantified and is referred to as Safety Instrumented Level (SIL) and is subject to very specific and rigorous statutory and operator functional requirements.

There is thus a market in the sub sea oil and gas industry for high reliability actuators for actuation of several mechanisms of critical importance, all characterised by a need for dependability of the "shift position" operation after prolonged service in the normal operating mode (steady state production).

In production systems based on conventional electro-hydraulic control such functionality as described above is found e.g. in ESD type control valves. These valves can be located topsides or sub sea and are characterised by permanently energised solenoid pilots in the normal operating mode. In the ESD mode the electrical power is either deliberately or inadvertently switched off, leading to a safe condition of critical process/ESD valves in the pressure containment system, the latter being controlled by said ESD directional control valves (DCV).

The use of solenoids to provide the transformation of electrical power into force and motion is quite universal in the sub sea oil and gas industry. Solenoids are robust and reliable devices but produce very little force per ampere-turn, especially in the early phase of the stroke. This has led to hydraulic directional control valves (DCVs) being equipped with a poppet type solenoid preamplifier to shift the slider in the valve (the latter being typically a high friction shear seal design) in order to provide sufficient force to overcome dynamic and static friction forces.

These poppet valves are particularly prone to failure by fluid particulate contamination by virtue of the high pressures and thus the very small dimensions of the poppet being required in view of the low mechanical force available from the solenoid.

Similarly, attempts at providing a fail safe mechanism for e.g. electric actuators tend to either work with low mechanical forces or large magnetic devices.

Prior art is very comprehensive. As an example of a recent approach to electrical actuation for a down-hole safety valve application US 2004/01173362 may be referred to.

SUMMARY OF THE INVENTION

The present invention aims at a sub sea actuator that provides a simple and reliable design.

The present invention further aims at avoiding the problems and drawbacks connected with the use of solenoids in sub sea actuators.

A shape memory alloy (SMA), or shape memory metal (SMM), in the following collectively referred to as SMA, changing its shape under the influence of heat or removal of heat, forms the basis of a very reliable actuation system.

As applied in a sub sea environment much improved cooling cycles can be provided. More importantly, an SMA actuator lends itself to robust mechanical and thermal designs, opens for a wide range of tradeoffs between response time and requirement for power input, and also lends itself to heating by electrical power in a sub sea environment, either by conduction or induction and thus also to remote control over long distances.

An SMA spring, typically in the form of a beam or coiled spring, thermally insulated and controllably heated by means of typically an electrically insulated coil of wire, inducing eddy currents into the SMA element, or by means of electrical conduction, and thus providing a motion at high force as the SMA spring contracts/expands under the influence of heat, is proposed to be the basic element in several types of fail safe mechanisms, depending on a regular mechanical return spring operating in the elastic domain to bring the actuator back to essentially the cold starting position on the loss of power by accident or intention.

A device which combines low power consumption and high mechanical force can be made by means of an SMA based actuator system. Depending on the thermal time constant designed into such a device it is possible to combine high mechanical force and relevant stroke length with acceptable power consumption and environmental robustness. The downside in general is the time response which will be relatively slow (in a conventional topside sense) for a low power consumption. However, this is for most sub sea applications acceptable. Most ESD sequences work in the minute's domain in a sub sea environment, some have been as slow as 10 minutes in older systems. In fact ESD systems (only referred to production control, whereas work-over control systems are subject to fast response to ESD situation) should be deliberately designed for sluggish response to avoid spurious incidents by glitches in transmission and power distribution systems and communication systems. A time delay of 30 seconds or a minute is considered prudent for stability.

As a minimum the following sub sea functions could benefit from use of an SMA type actuator:
1. Shear seal type DCV, directly operated, no preamplifier, typically as used for ESD functions
2. Fail safe mechanism for an electro-mechanically operated actuator
3. Direct SMA operation of process valves in combination with the fail safe mechanism as per function 2 above, fail-safe and fail-to-last position
4. Down Hole Safety Valve (DHSV)
5. Down hole sliding sleeve For all these examples of functions in a sub sea production control system the relatively slow time response to command is acceptable and in some cases even desirable.

In brief, the present invention provides a sub sea actuator comprising an actuator housing, wherein an activating element is movably arranged between activating and deactivating positions, respectively, wherein a return spring is supported in the actuator housing to move the activating element into the deactivating position. An SMA element is supported in the actuator housing and arranged with temperature elevating means by which the temperature of the SMA element is controllable, the SMA element acting on the activating element to move the activating element into the activating position against the force of the return spring in result of a rise in the temperature of the SMA element.

The temperature elevating means is a conductive heating means or an inductive heating means.

In one preferred embodiment, the temperature elevating means is an electric wire.

In another preferred embodiment the temperature elevating means is a heated fluid.

The SMA element may be realized in forms of a wire, a rod, a plate or a spring member. In the latter case, the SMA element may have the shape of a plate spring or a helix. In one embodiment, the SMA element is shaped as a coil of dual windings, both ends of which are connectable to an electric circuitry.

The SMA element preferably has an axial extension between a first and a second end, and comprises a number of individual SMA element members reaching from the first to the second end and defining between them a number of passages for heated fluid to pass between the individual SMA members.

In such an embodiment, each individual SMA member may be the shape of a rod or a plate such as an arcuate plate extending between the first and second ends. The SMA element is advantageously composed of a number of individual SMA element members stacked one after the other on a circle, or composed of two or more SMA elements or packages of individual SMA element members stacked one after the other in a series.

The SMA element can be arranged in a chamber which is connectable to a supply of heated fluid for fluid circulation through the chamber. Additionally, the SMA element can be arranged in a chamber which is connectable also to a supply of cooling fluid.

It is further conceived, that the operational range of the SMA element comprises both the martensitic and the austenitic phases.

In a sub sea actuator according to the present invention, two SMA elements can be arranged to be operated alternately and in opposite directions in order to provide a reciprocal motion to the actuating element. This embodiment is useful when the invention is realized as part of a fail-to-last mechanism in an electrical actuator system. Specifically, the actuating element can be realized as a slider which is journalled for reciprocal motion in an actuator housing, each respective end of the slider being connected to an SMA element effecting displacement of the slider upon release of a locking mechanism, and each respective end of the slider being associated with a locking mechanism comprising a lock release SMA element and a lock return spring.

The activating element may advantageously be a separate element movably arranged in the actuator housing, from a group of elements comprising sliders, stems, levers, rods, and plates, or in the alternative the activating element is preferably an integrated part of the SMA element, such as locking mechanism.

Without limiting the invention to the following examples, other useful implementations include the use of a sub sea actuator for controlling a directional control valve (DCV) comprised in an electro-hydraulic control circuit in a sub sea production control system, or the use of a sub sea actuator for activation of emergency shut-down function (ESD) of a sub sea production system, or the use of a sub sea actuator in an actuation system for a process valve based on an SMA spring element performing direct actuation of a control device.

BRIEF DESCRIPTION OF THE DRAWINGS

Further advantages as well as advantageous features of the present invention will appear from the following description with reference to the drawings. In the drawings.

DETAILED DESCRIPTION OF PREFERRED EMBODIMENTS OF THE INVENTION

Figure 1:
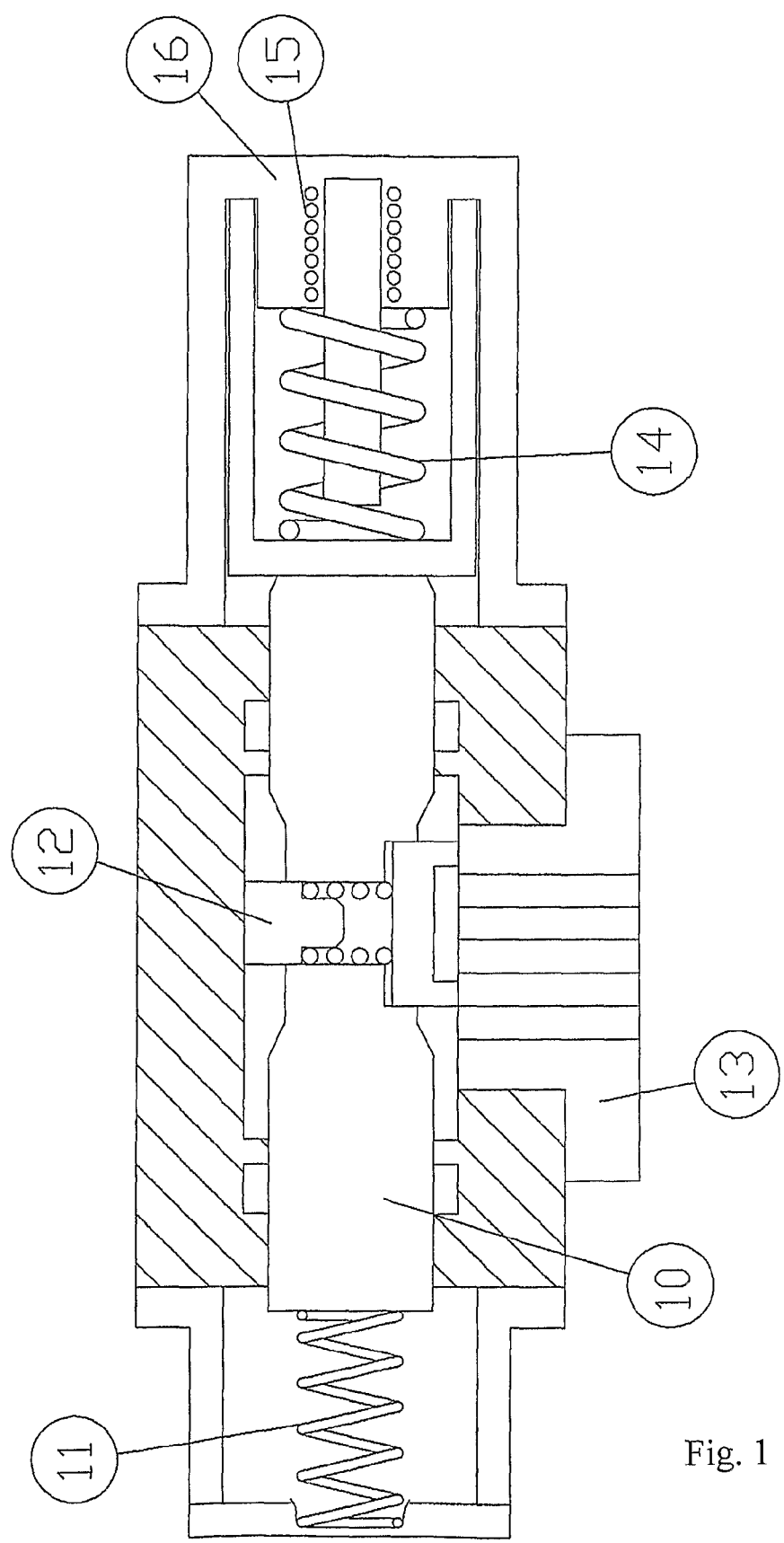
FIG. 1 illustrates DCVs with direct SMA actuation of a slider with SMA coil and return coil spring.

In the following preferred embodiments of the invention are described with reference to the drawings. Several preferred embodiment are included, but it should be understood that several other embodiments based on the same basic principles could be pursued to suit various applications. Such variations in design will be obvious to those conversant with design of sub sea electro-mechanical devices, sub sea thermal insulation and sub sea electrical circuitry.

The SMA actuator, as pursued in a sub sea environment may be a thermally insulated element/spring made from e.g. Nickel-Titanium or other alloys/materials exhibiting SMA characteristics. The shape memory alloy/material may have a linear shape, a coil shape, a curved shape or any other suitable shape depending on the specific application.

Such an SMA element/spring may be deformed in one temperature domain; on heating to a higher temperature domain it will revert towards its original position and exert considerable force on any object impeding the reverse motion. When the source of heat is removed, the SMA spring goes gradually back to the lower temperature characteristics. Another spring of conventional characteristics, and operating only in the elastic mode, may be used to provide the reverse motion. The SMA element/spring thermal domains can be accurately designed by suitable selection of metallurgical composition, thus a number of domains may be selected depending on application. For instance, it is obvious that most DHSV actuators of this type would have a metallurgical composition different from that used for ESD type hydraulic valve actuators, the former being located in an environment of anything from 20 to 200 degrees C. and the latter being located in a sub sea control module (SCM) and operating typically in a 0-8 degrees C. thermal environment.

In order to limit the amount of power required for the SMA element, it is equipped with thermal insulation. The power consumed is reduced by this insulation, however, the response to switch-on and switch-off commands, represented by heating and cooling respectively, is also affected by the amount of thermal insulation.

For sub sea applications there are very few control functions that require, or are even desired to be, of fast response. This is true even for emergency shutdown (ESD) situation. It is undesirable that such action is too responsive to ESD signals in order to avoid undesirable ESDs on spurious signals and system glitches. Restarting an oil field after a shutdown can be a cumbersome and costly business. It is thus not desirable, and by no means common, that ESD systems are designed to operate with very fast sequences.

By the same token, a minor time delay in the action of opening a process valve is by no means critical (compressor anti-surge valves making a significant exception). Most such actions take typically 10s of seconds and typically for larger valves anything from 30 to 60 seconds.

Thus the otherwise (in other applications) undesirable feature of an SMA actuator, i.e. its relatively slow response to command, has little, if any, negative effect in a sub sea environment and is, to the contrary, in most cases desirable.

An SMA actuator as described is capable of producing very high force in response to a low power input, using time to integrate the energy required to perform a certain amount of work, such as shifting a valve slider/ball, or energizing a mechanical fail-safe mechanism, the latter being part of an ESD system. Despite the obvious contradiction in terms, an SMA actuator is an actuator without moving parts, at least in the sense of "moving" as related to bearings, pivots, friction and other elements relevant to mechanical moving parts.

The preferred heater system for the SMA actuator is by electrical induction wherever suitable, thus alleviating the need for termination of supply wires. Obviously the same functionality may be achieved by electrical conduction or other means like hot water etc. for cases where induction is not practical.

The inductive circuit comprises a simple winding (electrical coil) located around the SMA element/spring, or another element organised for the purpose of heating, located such as to offer the actuating element freedom of motion without conflict with the electrical coil.

For some cases of SMAs, especially SMAs in the form of mechanical coil shaped spring, the inductive heater may be impracticable and conductive heating is preferred. A metal spring of practical dimensions will be of very high electrical conductivity and may thus only operate at a very low voltage in order to produce heat of practical interest, i.e. only AC operation will be of interest also for the conductive version as it will require a transformer located in the immediate vicinity of the heater arrangement. In fact the most practical arrangement may be to partially integrate the conductive heater element and the transformer secondary winding. The various preferred embodiments will require their own adaptations as required. Direct conductive heating of the SMA material can also be done by high frequency electrical currents using the skin effect. The transformer might then be obsolete.

Preferred embodiments are described thus for the following areas:

1 Directional control valve (DCV) for ESD or valve actuator control
2 Mechanical fail-safe mechanism
3 Direct SMA actuation for process valves
4 Direct electrical actuation of DHSVs
5 Fail-to-last position
6 Actuator control using water circulation 1. DCV Operation, Electro-Hydraulic Trigger Circuit for ESD In a traditional electro-hydraulic control system the fail-safe function is maintained by an energised solenoid pilot valve controlling the position of a DCV. The pilot valve function can be replaced by an SMA actuator. A number of configurations can be made for this purpose using SMA as activation material and a return spring for the failsafe function of the DCV as shown in FIGS. 1-5.

In FIG. 1 an SMA coil spring 14 is heated by a heating coil 15. When heated the SMA coil spring will expand pushing the slider 10 to the active position of the valve function and compressing the return spring 11. When the heating of the SMA spring is switched off, the SMA spring temperature will decrease and the SMA spring will be compressed by the forces from return spring 11. The slider will be moved to its opposite and fail-safe position.

Figure 2:
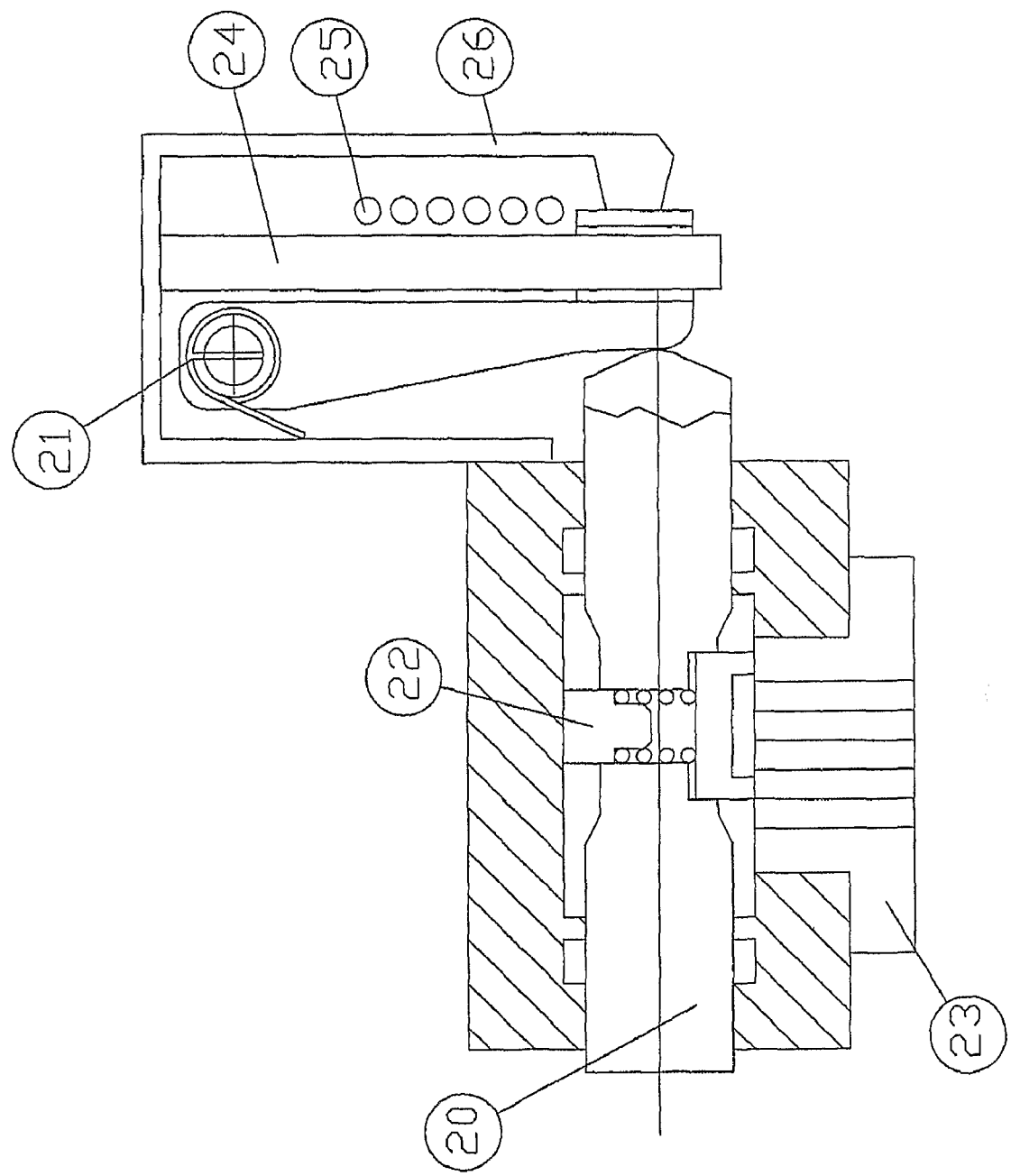
FIG. 2 illustrates DCVs with direct SMA actuation of a slider with SMA rod and rotational return spring.

In FIG. 2 the SMA spring is replaced by the function of an SMA rod 24 being heated by a heating coil 25. When heated the rod will expand/bend, compress the spring 21 by rotation and move the slider 20.

Figure 3:
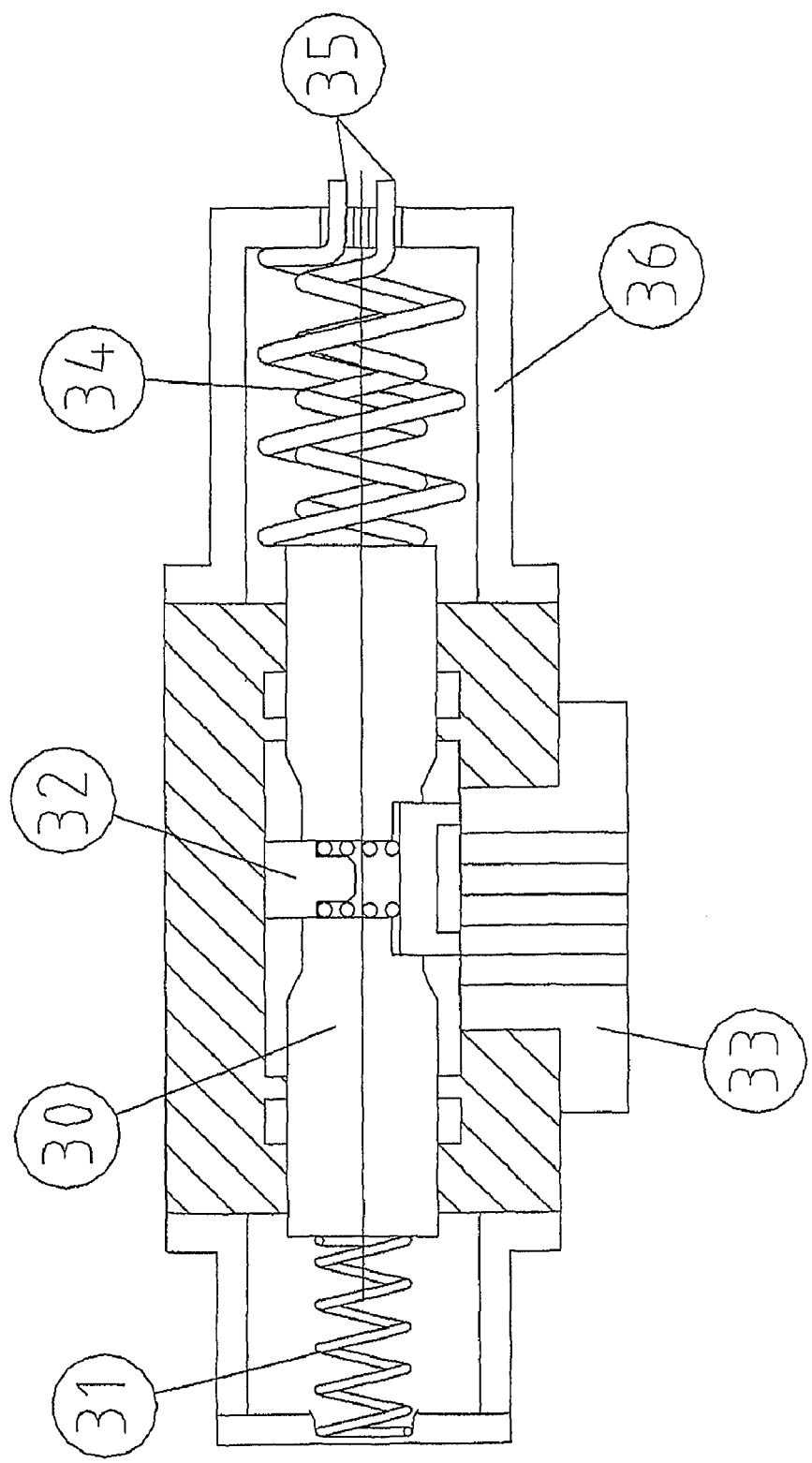
FIG. 3 illustrates DCVs with direct SMA actuation of a slider with SMA coil of dual windings, direct electrically operated.

In FIG. 3 the active SMA element is the shape of a coil of dual windings 34 heated directly by electric current through the stationary connection points 35. The SMA element 34 will expand, compress the return spring 31 and move the slider 30.

Figure 4:
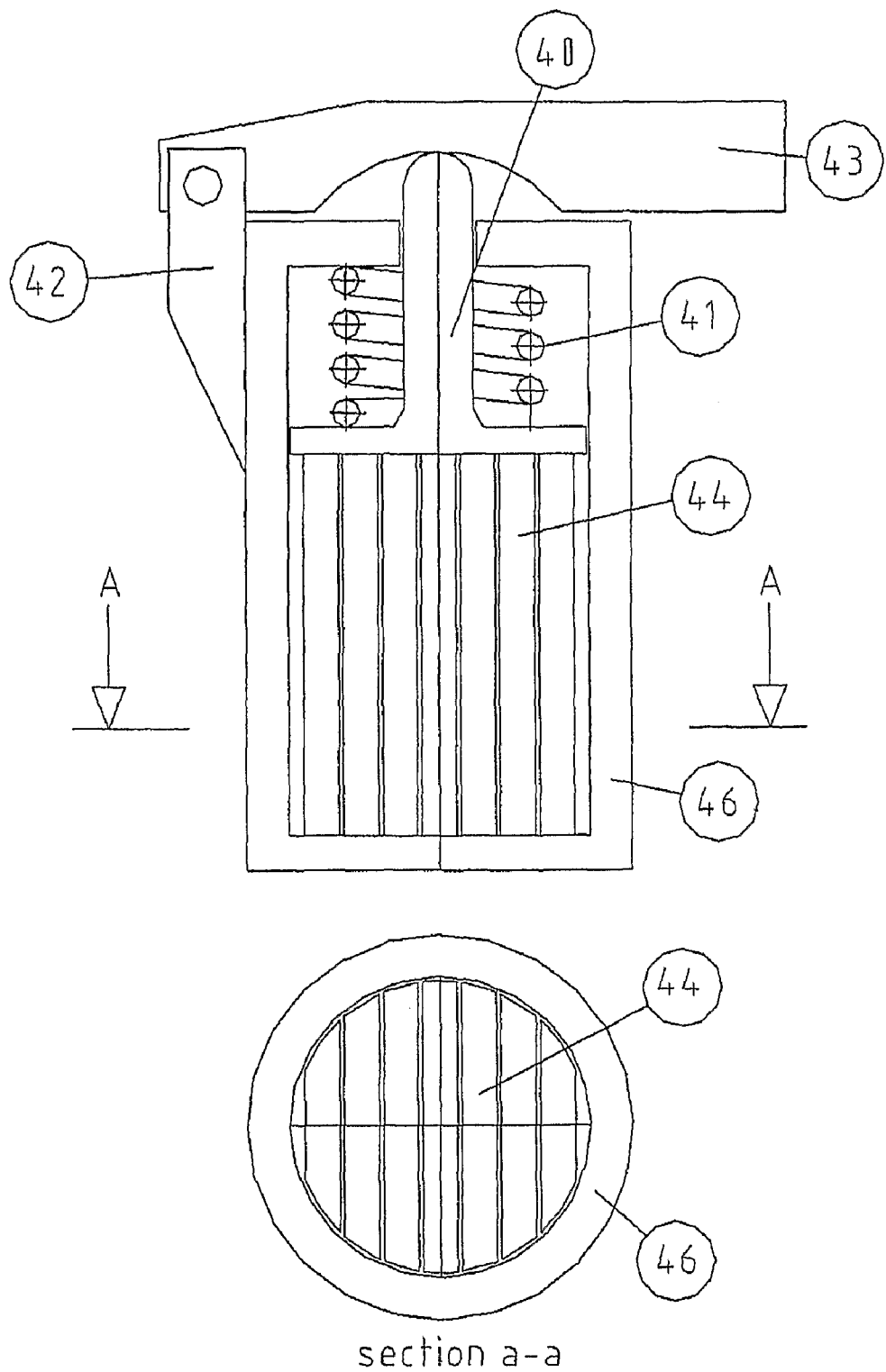
FIG. 4 illustrates DCVs with direct SMA actuation of a slider via a lever for extended stroke.

The actuator function illustrated in FIG. 4 is based on plates of SMA 44 being heated by circulation of hot water. The thermal expansion of the SMA element, in other words the stroke length, is extended using a lever 43.

Figure 5:
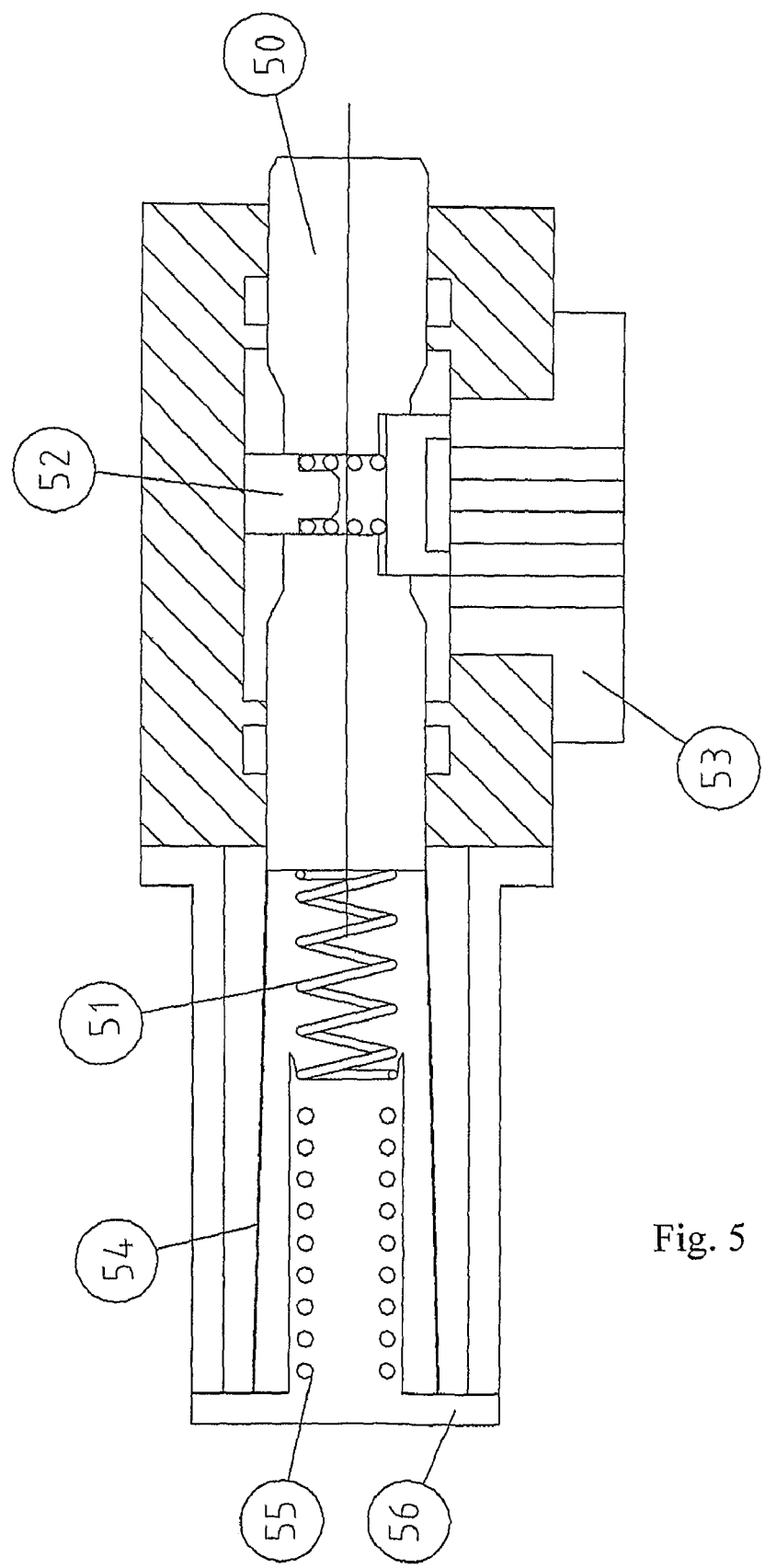
FIG. 5 illustrates DCVs with direct SMA actuation of a slider with SMA wire.

In FIG. 5 the active SMA element is made of straight wires 54 being heated directly by electric current. The SMA element 54 is arranged to act directly on a slider 50, against the force of a return spring 51.

2. Mechanical Fail-Safe Mechanism

A major problem with sub sea ESD systems is that so far it has not been possible to test ESD functionality without actually shutting down the well. Wells are typically tested for pressure integrity with intervals varying between 1 month and 6 months. During the intermediate periods it is highly desirable that production continue without interruption.

This practice is allowed in view of the very high reliability demonstrated for sub sea control systems and the capability to shut down on command. However, all ESD systems should have facilities to test the ESD capability at frequent intervals, thus actively demonstrating the SIL class. Also to prevent sticking of metal on metal after prolonged contact at high pressures occasional actuation is desirable.

Figure 6:
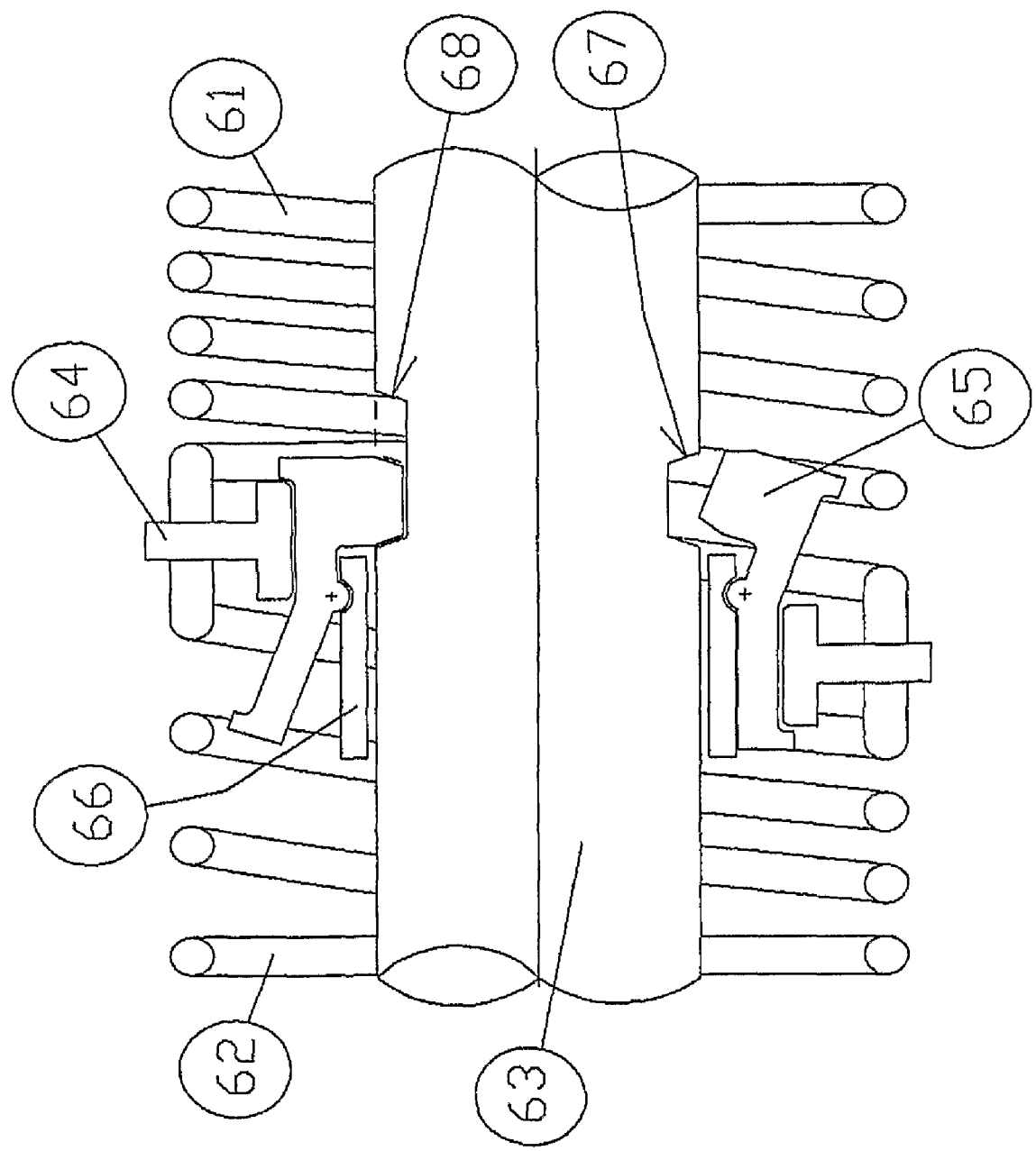
FIG. 6 is a principle sketch of an SMA element for a fail safe trigger mechanism in an actuator.

A fail-safe device as described in the following and based on SMA actuation principles can offer such facility. In FIG. 6 numeral 63 illustrates a section of an activating element in shape of a stem of an actuator, such as an electro-mechanical actuator for a large slab gate valve on a Christmas tree (XMT). Only the fail-safe related components are shown in the figure and the actuating components and the valve itself are omitted for clarity. Numeral 65 is a locking dog controllably inserted or retracted into/from groove 67 in the stem. Numeral 64 is a slider, controllably operating the locking dog by means of a reciprocating motion. The motion is provided by means of a conventional spring 61 operating in the elastic domain, and an SMA spring 62 at low temperature, or contracting in the austenitic phase under the influence of a heat source.

On heating of the SMA spring 62 the spring reverses to its original shape under high force and pull charges spring 61 into tension within elastic limits.

By introducing two trigger systems A and B, it is possible to test the valve failsafe function without closing the valve. In the ESD test mode trigger system A is first de-energised with trigger system B energised such that the actuator stem and thus the gate of the process valve is allowed to travel a short distance (typically a stroke of 5 mm) under action of the return spring 61. By extending the gate/valve by a similar amount as the difference between A groove and B groove (stroke 68) the gate may travel a short distance without exposing the gate to flow induced erosion.

The heating circuit is preferred to be inductive whenever suitable. Inductive circuits designed for eddy current heating are most efficient at higher frequencies, typically 10 kHz to 50 kHz in practical systems. Design based on very high frequencies could suffer some of the high frequency disadvantages well known to electrical engineers. Very low frequencies would result in large size components.

3. Direct SMA Actuation for a Process Valve

This preferred embodiment is similar to above-described preferred embodiment of mechanical fail-safe mechanism, except that the valve is a process valve directly operated by means of an SMA actuator. The process valve is typically of the slab gate design, but could also be a ball design as used in sub sea developments for typically manifold header isolation services and similar applications.

A 10 000 psi (referred to as 10 k) Master Valve (MV) or Wing Valve (WV) for a 5⅛ inch bore on a sub sea Christmas tree (XMT) typically requires a maximum force in order of magnitude 600 kN to open. This force is required to overcome the friction of the gate and the preload on the return spring in the actuator. The required stroke is in order of magnitude 160 mm. There will be variations in such figures depending on specific designs. A typical power consumption of such an actuator is in the range of 3-5 kW depending on design and time of response to command.

Process valves may be of the fail-safe type (reversion to a pre-determined state on failure) or fail-to-last-position type. A fail-safe design is typically designed as a force balance between an SMA type spring and a conventional spring. A fail-to-last-position design requires two SMA springs to work alternately to bring the valve from one extreme (end of stroke) position to the other extreme position.

Due to the very high forces involved in operation of process valves, especially of the fail-safe design, the SMA actuation mechanism will take on a different style and geometry than actuation mechanisms used for the DCVs and trigger mechanism described above. However, the basic principle of operation is the same. An SMA element of super-elastic characteristics works in conjunction with a conventional spring to create the strokes for open and close. The following description refers to FIGS. 8 and 9 for a fail-safe process actuator based on use of SMA.

Figure 8:
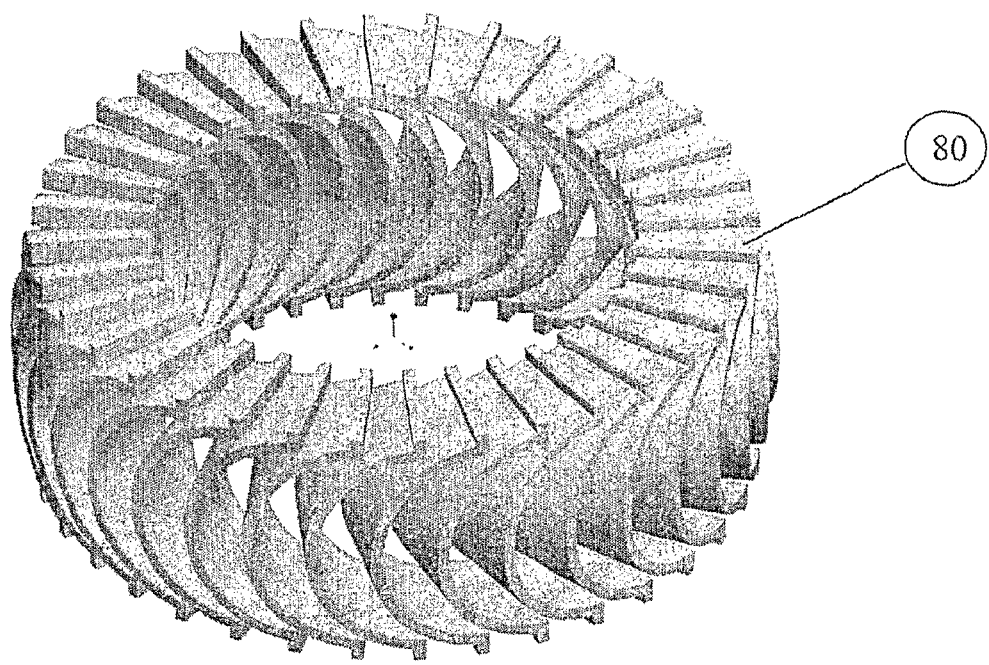
FIG. 8 is an illustration of a direct operated SMA actuator module comprising SMA elements for a large slab gate type process valve.
Figure 8:
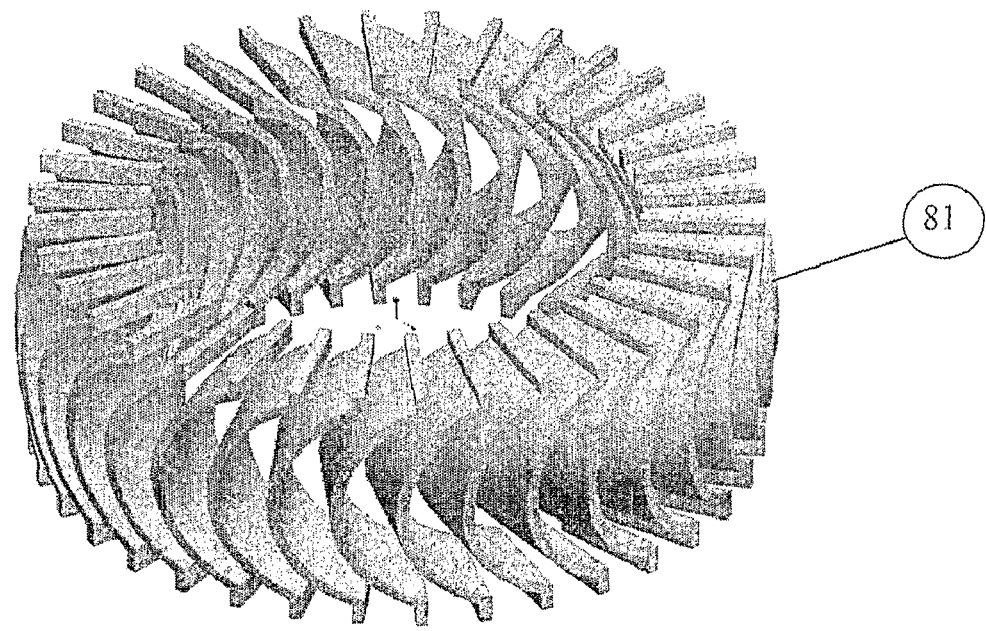
Figure 9:
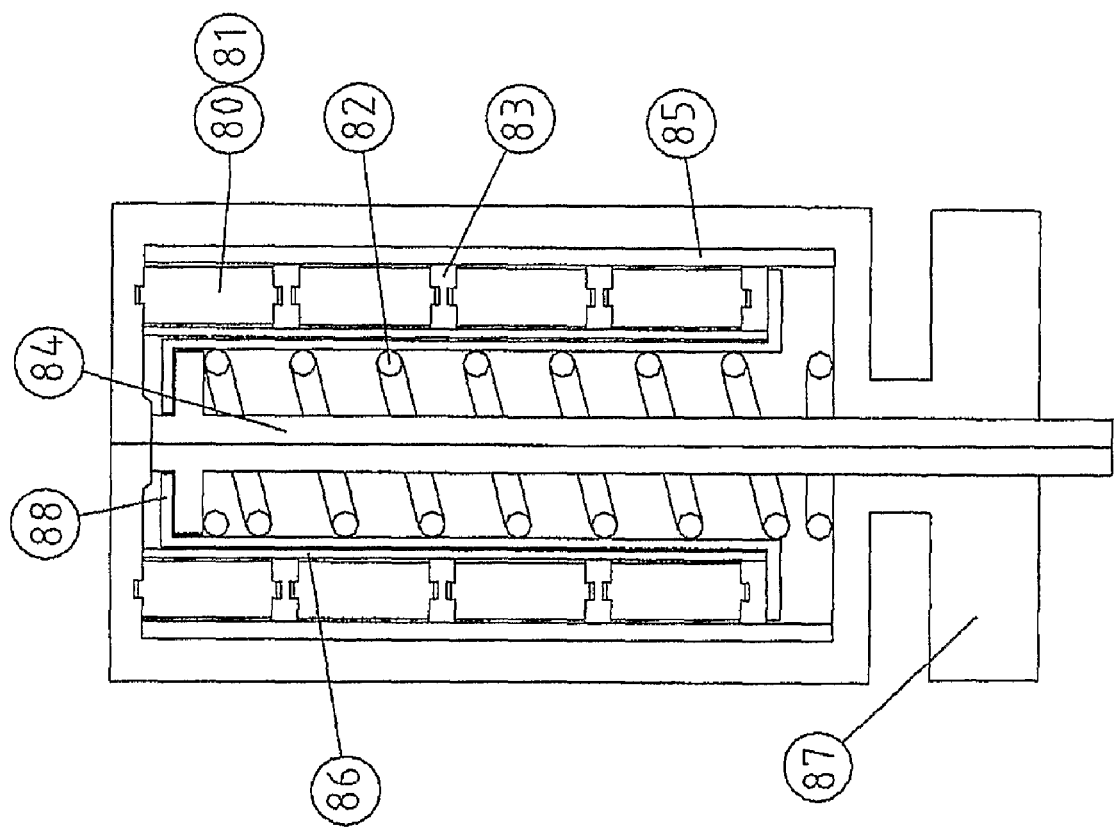
FIG. 9 illustrates an actuator composed of a number of modules shown in FIG. 8 stacked up to get sufficient stroke for operation of a large valve.

SMA can be shaped in different ways for different purposes. An alternative design for a process valve actuator, typically for a large slab gate type process valve, is shown in FIG. 8. The active SMA element is curved and installed between two plates. The upper part 80 of the figure shows the actuator element in a compressed position. When heated above the austenitic formation temperature, the actuator tends to straighten out moving the two plates apart from each other as shown in the lower part 81 of the figure. In order to get sufficient stroke to operate a process valve, a number of these actuator modules can be stacked up as shown in FIG. 9. When heated the SMA actuator element 80, 81 will expand and compress a return spring 82. The stem 84 will be pushed out operating a valve connected to the actuator via a flange 87. The SMA actuator elements are located inside a thermally insulated compartment 85, 86. Spacer plates 83 separate the actuator modules. The force from the SMA modules is transferred to the actuator stem and return spring through the actuator return spring housing 88.

An SMA actuator for direct operation of process valves can be arranged as shown on FIG. 8. The figure shows one module in compressed and in expanded position. A number of these modules can be stacked on top of each other for sufficient stroke length of the actuator to open and close process valves directly.

The closure of a fail-safe process valve at ESD conditions may require a faster closing cycle than available from de-energising the SMA as described above. It is thus appropriate to introduce a fail-safe mechanism such as described above to hold the valve in position by means of a small power supply and still achieve fast closure on command. The smaller mass of a fail safe trigger can combine a small power supply with a sufficiently fast closure. The main actuator would thus only be energised during active stroking and would be de-energised once the fail safe trigger mechanism is engaged.

In order to achieve an actuator, which exhibits fail-to-last position characteristics, the return spring is replaced by a second SMA unit/element. The two elements are operated in an alternating mode such that one SMA unit is heated to open the valve, then de-energised once the valve has reached the desired position. The valve remains in this position until the other SMA element is energised to push the actuator to the closed position. Energising is only required during the active stroke, typically in order of magnitude 30-60 seconds. For all other periods of time the entire assembly of SMAs and auxiliary components is cold. Thus, for more than typically 99.9% of the calendar time there are no thermal or electrical loads on the main actuator assembly.

4. Down-Hole Safety Valve (DHSV) Operation

The DHSV represent a major element in one out of two testable safety barriers in a typical well and is a particularly critical component. In its traditional conceptual form of hydraulic control it suffers from a number of imperfections:

The hydraulic control pressure is often required to be very high in order to overcome the hydrostatic head (tubing pressure) acting on the underside of the valve actuator hydraulic piston as well as the force of the return spring; both factors contribute to a very high operational pressure. Many cases have been recorded of DHSV control line hydrating up as a function of water based hydraulic fluid reacting with methane gas from the tubing at high pressure. This is a potentially very hazardous situation.

Gas from the tubing and brine from the annulus have been known to migrate into the control line and contaminate parts of the hydraulic control system. Over the last years design improvements in actuator sealing systems have reduced this risk, but it is not considered totally eliminated for all designs.

With the potential for contamination some operators install two hydraulic control lines per DHSV, i.e. for two such valves four lines can be needed. This approach which certainly improves performance also requires precious "real estate" in the tubing hanger, thus reducing the size of the production tubing.

The extremely high pressure required for hydraulically operated DHSV often result in separate supply lines from the platform or beach at high cost, or, alternatively hydraulic pressure intensifiers are required. The latter represent a complexity in the hydraulic circuitry, but are usually less costly than separate supply lines.

In recognition of all these disadvantages the industry has made many attempts at designing (at least conceptually) an electrically operated DHSV. Many designs involving electrical motors, gear boxes and clutch arrangements have been proposed. So far none has gained universal acceptance or has been believed to achieve the reliability required. Currently several electrical DHSV concepts are being pursued, partly based on novel approaches. It is a common perception in the industry that electrification of the DHSV is the most significant obstacle in the pursuit of an all electric production control system for sub sea oil field developments.

A DHSV based on an SMA actuator and electrical heating can significantly improve reliability of such valves. The section of tubing accommodating the DHSV is typically in order of magnitude two meters long (or may be made this long) and allows accommodation of any practical length of an actuator. Thus even increase in the overall length of the actuator is acceptable.

Flapper type valves are predominant as DHSV designs. Flapper DHSVs have a long record of successful operations and the industry would be reluctant to give up this type valve. Any new actuator system should thus be compatible with flapper type valves.

The dominant type of hydraulic control is unbalanced, i.e. a single hydraulic control line supplies high pressure to overcome both the force of the return spring and the reservoir pressure acting on the lower side of the piston. This is the most preferred option, "charged dome valves" where the lower side of the actuator is terminated in an isolated N2 volume.

In principle there is very little force/torque required to open the valve in terms of overcoming mechanical forces such as friction. A sleeve, commonly referred to as the flow tube, is used to turn the flapper and act as a protection for the flapper valve protecting it from the process fluid flow.

In addition to the reservoir pressure there is a mechanical return spring of significant force to be overcome by the hydraulic actuator. The spring force is high such as to provide all the closing force required when there is no pressure assist from the reservoir and then to lift the column of fluid in the hydraulic control line.

In addition to the high hydraulic pressure required for a hydraulic DHSV the stroke is very long, rendering the actuation task even worse. Although opening the valve itself only requires a short stroke, there is a requirement for running the flow tube over the valve flapper in order to protect it from oscillations and abrasion of the production fluid.

The resulting requirement for a hydraulic DHSV is the unfortunate combination of a long stroke at high pressure.

For the case of electrical actuation based on an SMA spring/element working with a traditional elastic spring, as per the system suggested for the above-described preferred embodiment of directional control valve for ESD or valve actuator control, the force equation would change substantially as the return spring is no longer required to lift a high column of fluid (typically anything from 2000 to 4000 ft). As the hydraulic control conduit is replaced by an electrical cable the potential hydrate problem and other potential contaminations of the hydraulic circuitry are alleviated.

Figure 7:
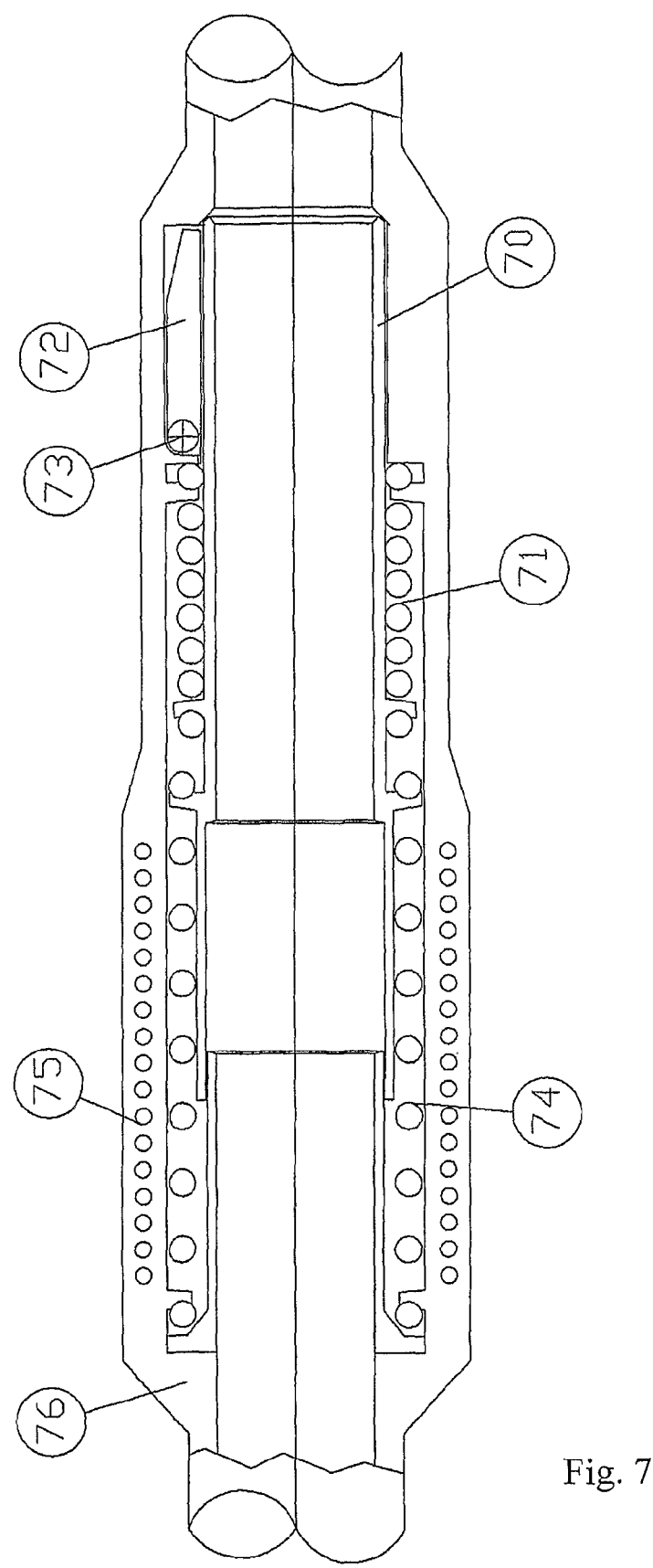
FIG. 7. illustrates operation of DHSV by means of an SMA based actuator.

FIG. 7 illustrates the same valve operated by means of an SMA based actuator.

The SMA spring 74 is heated by a heating coil 75. When heated the SMA coil spring expands pushing a sleeve 70 to the right forcing a flapper valve 72 to open and compressing the return spring 71. When the heating is switched off, the SMA actuator spring 74 will be compressed by the force from the return spring 71 and the flapper valve 72 is allowed to close by rotating around shaft 73.

While emergency shut down valves have been described as being closed upon actuation, the present invention would be equally applicable to valves which are opened upon actuation.

5. Fail-to-Last Position

Figure 10:
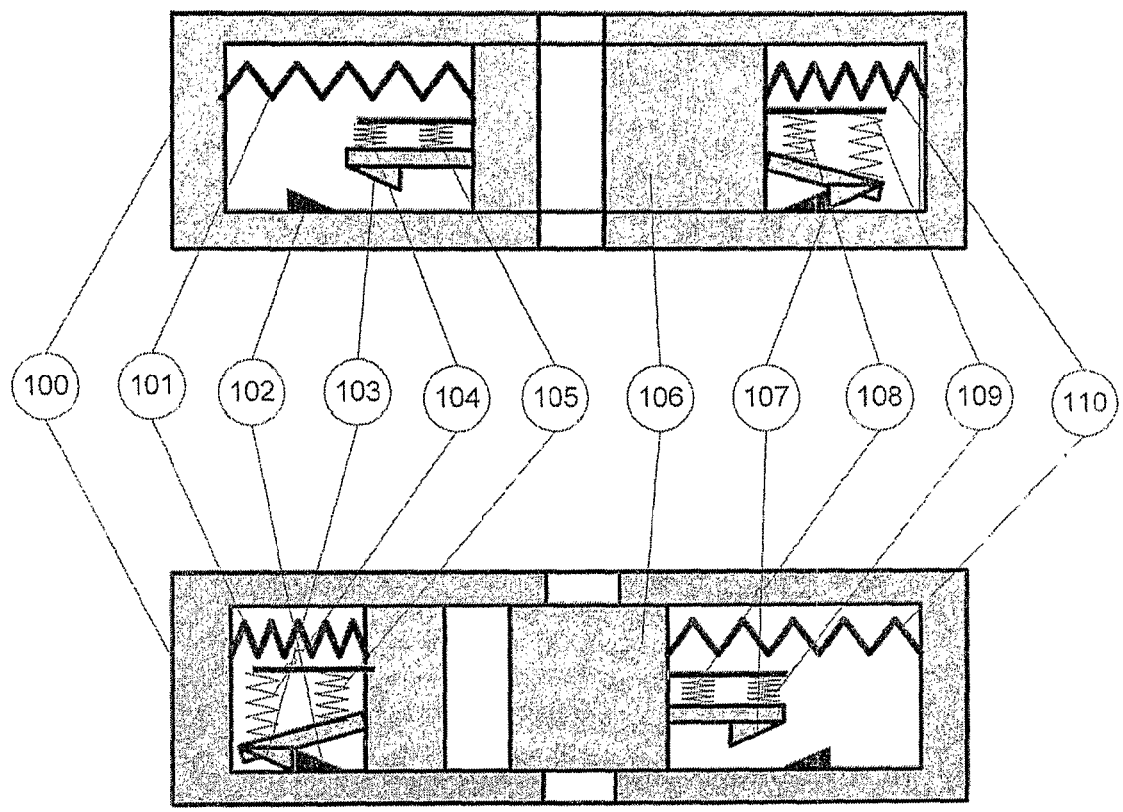
FIG. 10 illustrates principle of an SMA actuator fail-to-last position.

FIG. 10 shows a principle sketch of a valve device 100 controlled by two SMA springs 101, 110 and with a locking mechanism 103 for locking a slider 106 in opened or closed position.

The upper part of FIG. 10 shows the valve device in open position. By heating an SMA spring 104 it retracts and releases the locking mechanism 103 from lock 102 and compresses the locking mechanism return spring 105. Further heating of the SMA actuator spring 101 it will expand and push the slider 106 to open position where it is locked as shown in the upper of FIG. 10.

By heating an SMA spring 108 it will retract and release the lock 107 and compress a lock return spring 109. Further heating of the SMA actuator spring 110 it will expand and push the slider 106 to closed position where it will be locked as shown in the lower part of FIG. 10.

6. SMA Temperature Control Using Water Circulation

The SMA temperature can be controlled in many different ways. A water based heater system lends itself to exploitation of major advantages:

heating of water is simple and well proven and may be performed both conductively and inductively, water is kept near 100 degrees C. but below boiling point at a given water depth the heating system may be made dual redundant with moderate effort and cost using only a single physical connector (but dual redundant wiring) between a control module and the actuator unit the water may be heated by trickle charge power supply, i.e. heating the water over time at low power or, in the event of expected immediate activity, at a higher power level, controlled by the local control circuitry. This facilitates a very low steady state power consumption and is compatible with an economical power transmission system with as little cross section area of a power transmission cable as possible.

actuation by purging by means of preheated water will heat all the SMA elements quickly by means of providing suitable conduits in, or in between the SMA elements, thus reducing the risks of uneven heating and corresponding differential forces, potentially harmful to the actuator water at a high temperature has lower specific gravity than water at a lower temperature and will thus migrate to the top of the container, active pumping is required to make it pass from a high position to a lower position, thus a simple motor driven pump is the only element required to drive the hot water from the storage and heating tank to the SMA parts, no valves are required, very low differential pressure is required (typically 1 bar)

Figure 11:
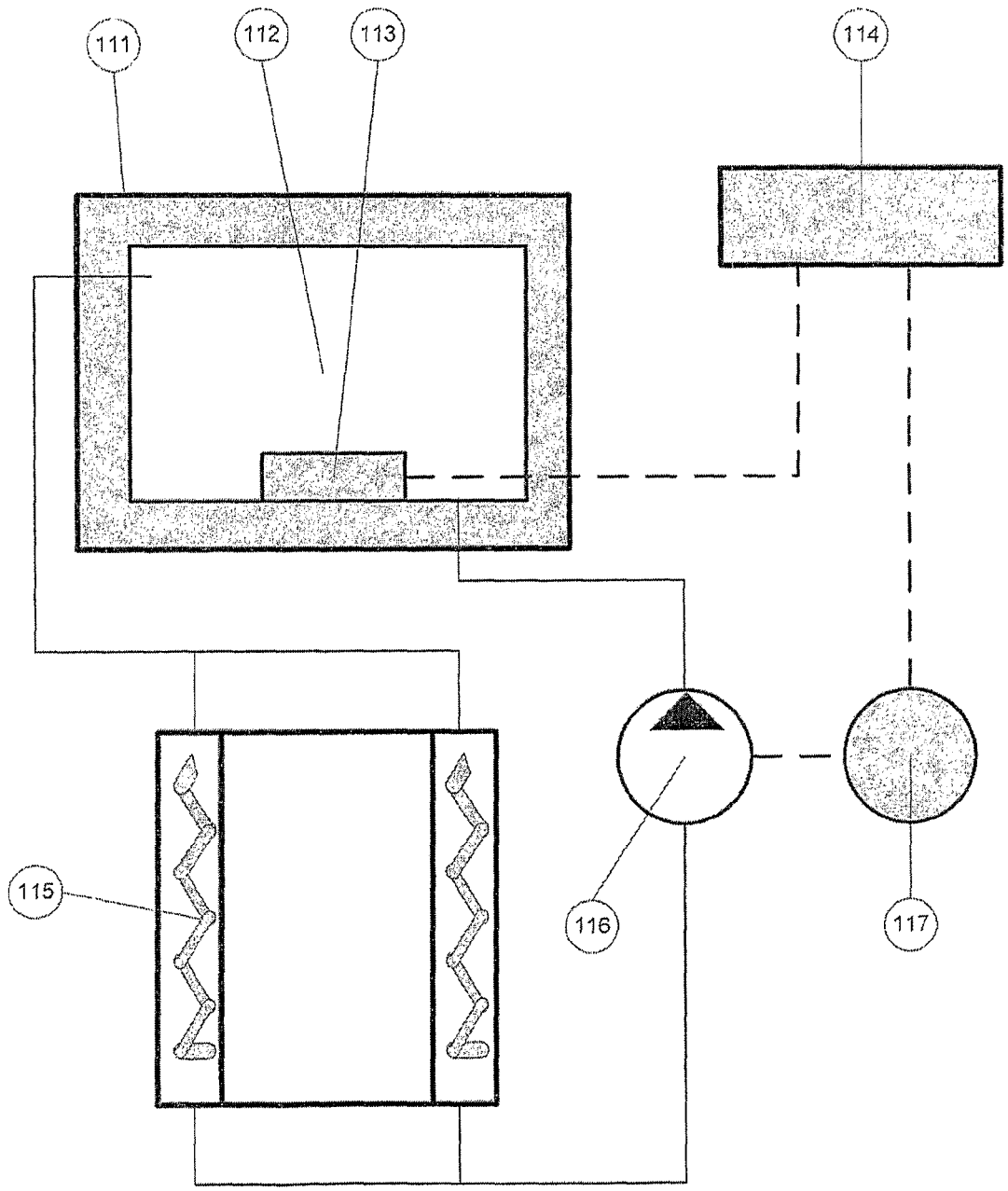
FIG. 11 illustrates an SMA actuator control using a hot water circulation system.
Figure 12:
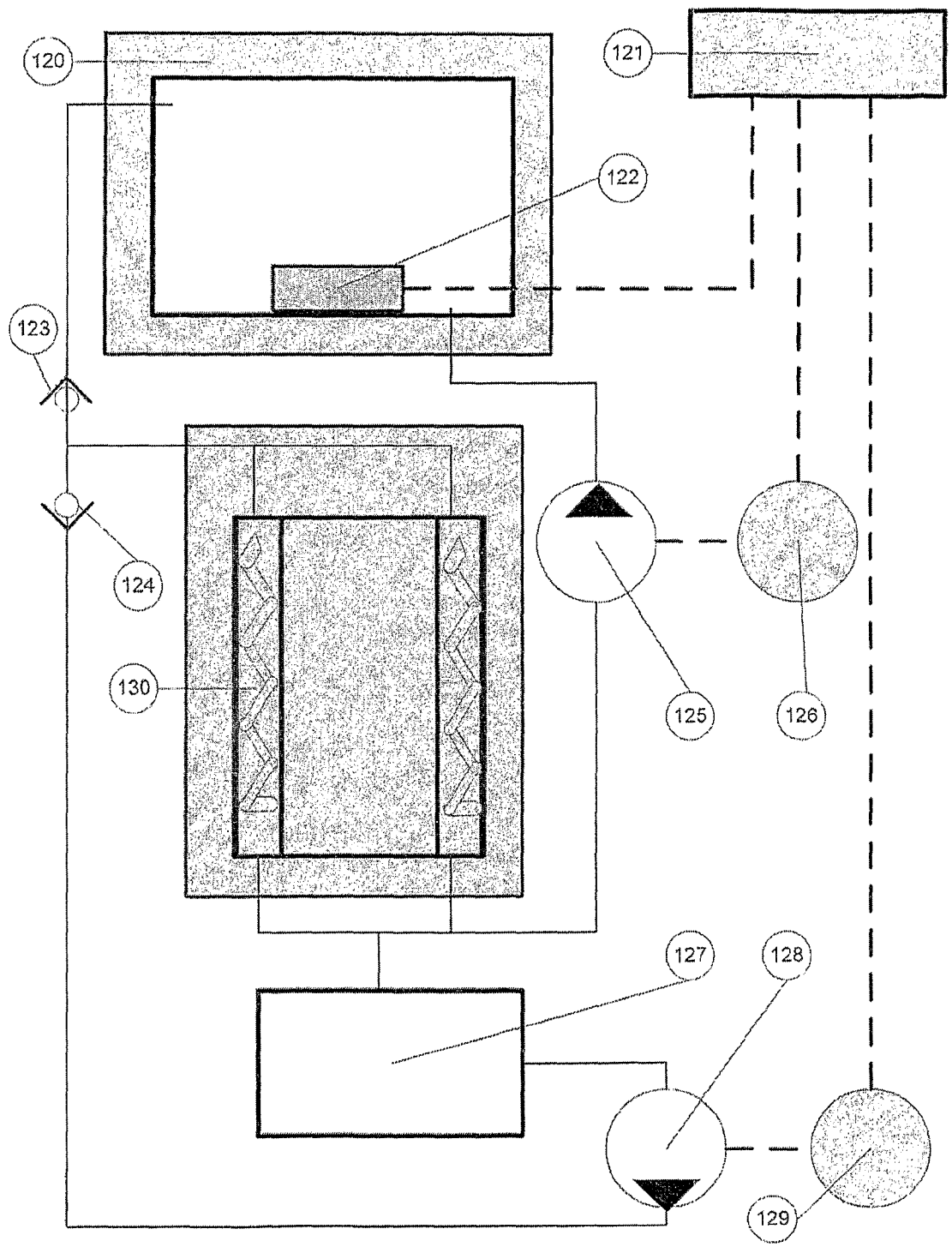
FIG. 12 shows an SMA actuator control using hot and cold water circulation systems.

Possible configuration of water circulation systems for SMA temperature control is shown in FIGS. 11 and 12.

FIG. 11 shows a system controlling an SMA actuator 115 temperature using water circulation. An insulated hot water tank 111 is filled with water being heated by a heater 113 controlled by a power and control unit 114. This unit also controls a motor 117 running a pump 116. When running the pump, hot water 112 from the tank 111 is circulated through the SMA actuator 115 until the actuator undergoes transformation from martensitic to austenitic phase and moves a valve from one position to another. When the pump is stopped, the SMA actuator will gradually reduce its temperature through heat transfer to the surroundings and go back to the martensitic phase shifting position of the valve.

FIG. 12 shows an arrangement where also cooling down of an SMA actuator 130 is forced by circulation of cold water.

An insulated hot water tank 120 is filled with water being heated by a heater 122 controlled by a power and control unit 121. This unit also controls a motor 126 running a pump 125. When running the pump, hot water from the tank 120 is circulated through the SMA actuator 130 until the actuator undergoes transformation from martensitic to austenitic phase and moves a valve from one position to another. When the pump is stopped, the SMA actuator will gradually reduce its temperature through heat transfer to the surroundings and go back to the martensitic phase shifting position of the valve. To reduce the valve actuator response time, another motor 129 driving a pump 128 for circulation of cold water from the cold water tank 127 through the SMA actuator 130 will cool down the actuator and shift the valve position. Check valves 123, 124 are used to prevent backflow in the passive pump circuit. The actuator can now be thermally insulated and this configuration will give faster response time and lower power consumption than the configuration shown in FIG. 11.

Feasible Modifications to Illustrated Embodiments

As illustrated in this disclosure, the SMA element may be arranged to shift a valve member directly, or indirectly via interconnecting means. An activating element, which is effected by the thermal expansion of the SMA element to shift the valve between the open and closed positions, respectively, may thus be arranged as a separate element movable in the actuator housing, and may alternatively be arranged as an integrated part of the SMA element.

Further, the two spring actuator system set up as coil springs may be organised to control a DHSV, with the springs organised substantially concentrically around the production tubing, the metallurgical composition of the SMM spring being preferably adjusted to stay in the plastically deformed state at the normal environmental temperature, controllable heating being provided by means of an electrical cable in the annulus and operating on AC or DC (such as shown in FIG. 7).

Also, the power for controllably heating the SMA spring may be supplied by a high frequency AC circuit using eddy currents and/or the skin effect to induce heat into the SMA spring environment.

Even further, the power for controllably heating the SMA spring may be supplied by an AC circuit with supply wires terminated at the same end of two concentric coil springs arranged such that the electrical terminals are both stationary, the motion of the external spring compensating for the internal spring, thus providing expansive motion from both springs without motion of the electrical terminals.

The present invention is not restricted to the embodiments described above. On the contrary, many possibilities to modifications thereof will be apparent to a person with ordinary skill in the art without departing from the basic idea of the invention such as defined in the appended claims.

LIST OF REFERENCES TO THE DRAWINGS

FIG. 1-3:
10, 20, 30: slider
11, 21, 31: return spring
12, 22, 32: sealing spring support
13, 23, 33: valve/piping interface
14, 24. 34: SMA coil spring, SMA rod, SMA coil of dual windings respectively
15, 25 heating coil
35 stationary connection points
16, 26, 36: actuator housing
FIG. 4:
40 activation rod
41 return spring
42 activation lever support
43 lever
44 plates of SMA
45 not used
46 actuator housing
FIG. 5:
50 slider
51 return spring
52 sealing spring support
53 valve/piping interface
54 SMA straight wires
55 thermal insulation
56 actuator housing
FIG. 6:
61 conventional spring
62 SMA spring
63 part of actuator stem
64 slider
65 locking dog
66 locking dog support
67 groove
68 stroke
FIG. 7:
70 sleeve
71 return spring
72 flapper valve
73 shaft
74 SMA spring
75 heating coil
76 actuator housing
FIG. 8 and FIG. 9:
80 SMA element (in compressed condition)
81 SMA element (in extended condition)
82 return spring
83 spacer plate
84 actuating element/stem
85-86 thermally insulated compartment
87 valve/piping interface
88 return spring housing
FIG. 10:
100 valve
101 SMA element/spring
102 lock
103 locking mechanism
104 SMA spring
105 return spring
106 slider
107 lock
108 SMA spring
109 return spring
110 SMA element/spring
FIG. 11:
111 hot water tank
112 hot water
113 heater
114 control unit
115 SMA element/actuator
116 pump 117 motor
FIG. 12:
120 hot water tank
121 control unit
122 heater
123-124 check valves
125 pump
126 motor
127 cold water tank
128 pump
129 motor
130 SMA element/actuator

The invention claimed is:

1. A sub sea actuator, comprising:
an actuator housing,
an activating element movably arranged between activating and deactivating positions,
a return spring supported in the actuator housing to move the activating element into the deactivating position, and
at least two SMA elements supported in the housing and comprising a temperature elevator configured to control a temperature of the SMA elements, wherein the SMA elements act on the activating element to move the activating element into the activating position against a force of the return spring as a result of a rise in the temperature of the SMA elements, wherein the SMA elements have an axial extension between a first end and a second end, and wherein the SMA elements comprise a number of individual SMA element members reaching from the first end to the second end, defining between the first end and the second end a number of passages for heated fluid to pass between the individual SMA element members, wherein the SMA elements are arranged to be operated alternately and in opposite directions in order to provide a reciprocal motion to the actuating element, and wherein the activating element comprises a slider journalled for reciprocal motion in an actuator housing, each respective end of the slider being connected to an SMA element effecting displacement of the slider upon release of a locking mechanism, and each respective end of the slider being associated with a locking mechanism comprising a lock release SMA element and a lock return spring.

2. The sub sea actuator according to claim 1, wherein an individual SMA element member of the at least two SMA elements is one of a wire, a rod, a plate and a spring member.

3. The sub sea actuator according to claim 2, wherein the individual SMA element member is the shape of a helix.

4. The sub sea actuator according to claim 2, wherein each individual SMA element member is the shape of an arcuate plate between the first and second ends.

5. The sub sea actuator according to claim 1, wherein the at least two SMA elements comprise a number of individual SMA element members stacked one after the other on a circle.

6. The sub sea actuator according to claim 1, wherein the at least two SMA elements are stacked one after the other in a series.

7. The sub sea actuator according to claim 1, wherein the SMA elements are arranged in a chamber which is connectable to a supply of heated fluid for fluid circulation through the chamber.

8. The sub sea actuator according to claim 7, wherein the SMA elements are arranged in a chamber which in addition to a supply of heated fluid is connectable to a supply of cooling fluid.

9. The sub sea actuator according to claim 1, wherein an operational range of the SMA elements comprise both the martensitic and the austenitic phases.

10. The sub sea actuator according to claim 1, wherein the activating element is an integrated part of the SMA elements, or in the alternative is a separate element movably arranged in the actuator housing, and wherein the activating element is selected from a group of elements comprising sliders, stems, levers, rods, and plates.

11. The use of a sub sea actuator according to claim 1 for controlling a directional control valve comprised in an electro-hydraulic control circuit in a sub sea production control system.

12. The use of a sub sea actuator according to claim 1 for activation of emergency shut-down function of a sub sea production system.

13. The use of a sub sea actuator according to claim 1 in an actuation system for a process valve based on a SMA element performing direct actuation of the process valve.

14. The use of a sub sea actuator according to claim 1 which operates in a fail-to-last position manner in an electrical actuator system.

* * * * *